United States Patent [19]

Kaufman

[11] 4,189,993
[45] Feb. 26, 1980

[54] OIL SPLATTER SCREEN FOR A DEEP FAT FRYER

[76] Inventor: Joseph R. Kaufman, 1331 Oakbrook Dr., Largo, Fla. 33540

[21] Appl. No.: 874,811

[22] Filed: Feb. 3, 1978

[51] Int. Cl.$^2$ ............................................. A47J 37/12
[52] U.S. Cl. .................................. 99/403; 126/214 D
[58] Field of Search ............... 126/214 D, 299 C, 373; 99/403, 410, 415, 414, 418; 210/DIG. 8, 470, 1, 464, 5

[56] References Cited

U.S. PATENT DOCUMENTS

| | | | |
|---|---|---|---|
| 642,262 | 1/1900 | Sarles | 210/270 |
| 659,145 | 10/1900 | Golding | 99/418 |
| 812,564 | 2/1906 | Henderson | 99/410 |
| 2,283,488 | 3/1942 | Cox | 210/471 |
| 2,342,067 | 2/1944 | Turner | 99/418 |
| 2,658,444 | 11/1953 | Wheeler | 99/410 |
| 3,390,781 | 7/1968 | Anderson | 210/465 |

FOREIGN PATENT DOCUMENTS 204801  3/1956  Australia .................... 210/464

*Primary Examiner*—Albert W. Davis, Jr.
*Assistant Examiner*—Gerald Anderson

[57] ABSTRACT

An oil splatter screen for a deep fat fryer is disclosed which protects the cook and the kitchen from hot oil drops splattered from a deep fat fryer. The device consists of a food basket with a bottom platform for supporting food to be fried, having a transverse dimension which is less than the inside transverse dimension of the frying vessel. A rod is mounted to the bottom platform of the basket, which projects upwardly to a height which is greater than the depth of the frying vessel. The rod supports the basket from above while it is being lowered into the vessel. A splatter screen is slideably mounted onto the rod, having a transverse dimension which is greater than the transverse dimension of the frying vessel's cavity. The splatter screen is supported and remains at the lip of the vessel while the basket is lowered into the cavity of the vessel by means of the rod sliding past the screen. The screen intercepts oil droplets splattered from hot oil in the frying vessel while permitting water vapor evolved from the foods being fried in the vessel, to escape without condensation. Thus oil splatters are prevented during the critical time when the foods to be fried are initially immersed into the hot cooking oil.

5 Claims, 5 Drawing Figures

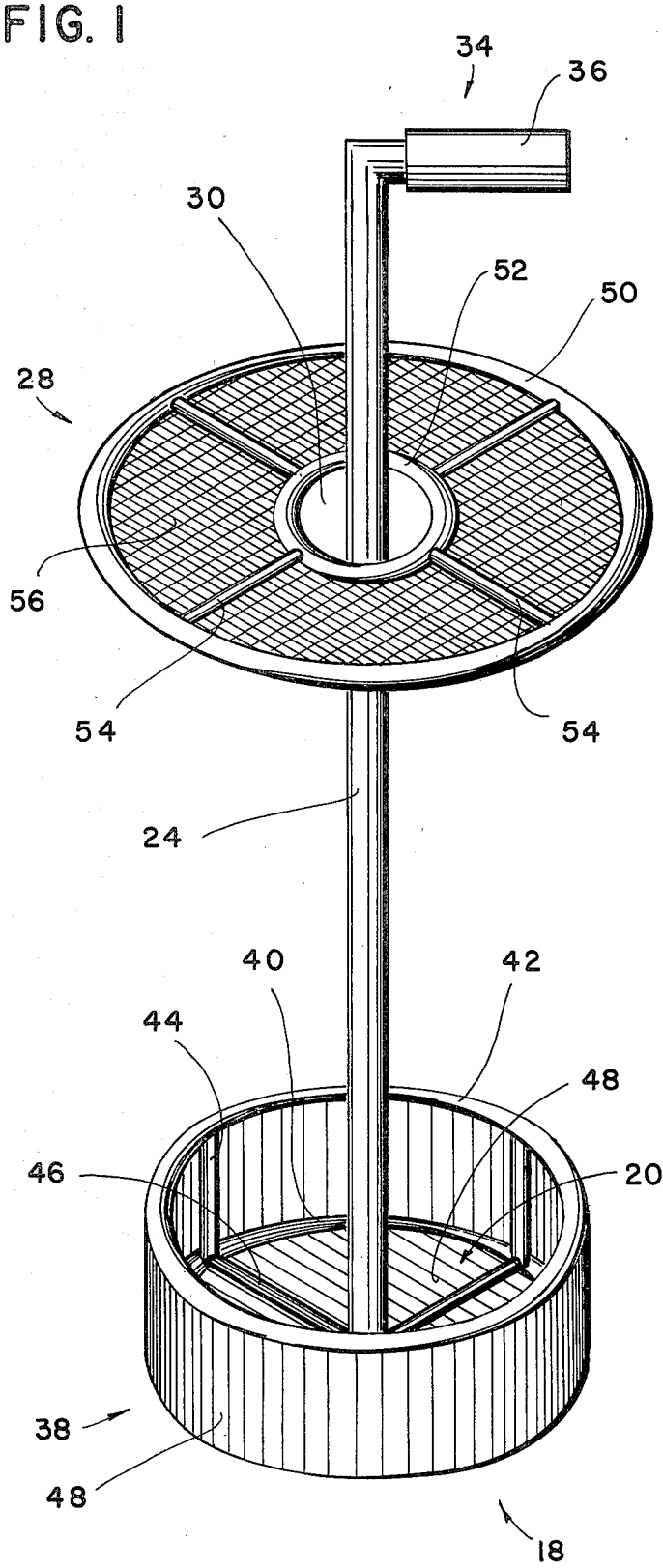
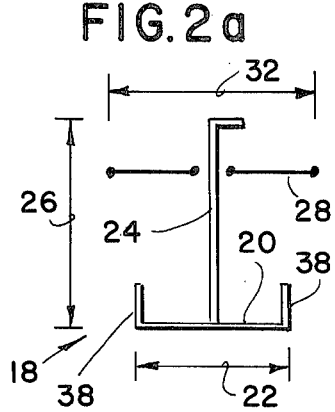
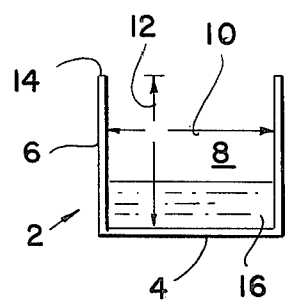
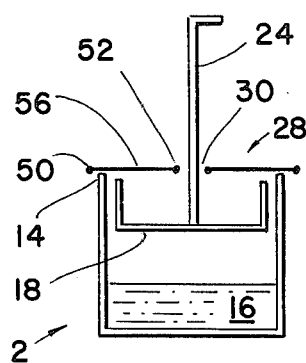
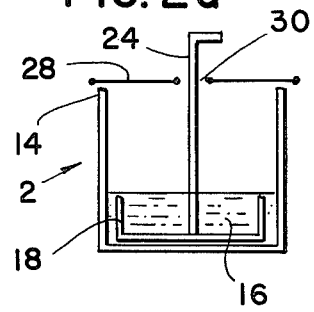

OIL SPLATTER SCREEN FOR A DEEP FAT FRYER

FIELD OF THE INVENTION

The invention disclosed broadly relates to cooking apparatus and more particularly relates to food conveyers for deep fat fryers.

BACKGROUND OF THE INVENTION

Frying is an ancient cooking operation wherein the food to be cooked is placed in contact with a cooking oil which is heated to a relatively high temperature. The amount of cooking oil varies from a small amount in sauteing or pan-frying to enough to cover the food in deep fat frying. The cooking temperature is not limited by the boiling point but by the smoking temperature of the oil, that is the temperature at which the oil decomposes and fumes become visible. Because the decomposition is irreversible and reduces the usefulness of the oil, heating an oil to its smoking point is to be avoided. Temperatures of from 350° to 390° F. are generally employed in deep fat frying. Animal or vegetable oils are generally used as the frying medium, for example corn oil has a high smoke point so that it can withstand high frying temperatures up to 440° F. without smoking or burning.

Deep fat fryers are made of cast iron, sheet steel, stainless steel or aluminum, and are provided with a wire immersion basket for holding and draining food.

The best frying temperature is about 375° F., which is suitable for frying meats, fish, vegetables and pastries. The deep fat fryer is filled one-third full with the cooking oil and brought to the desired cooking temperature. Fresh or frozen food to be fried is then inserted into the basket and the basket immersed into the hot oil. At initial contact of the food with the hot oil, any water or ice in contact with the food is instantly vaporized and forms small pockets of steam which expand with an almost explosive force. The steam propels small droplets of the hot cooking oil out of the oil reservoir and splatters them on all surrounding surfaces including the cook and the kitchen. Not only does this pose a cleaning problem but, more importantly, it poses a primary hazard of scalding or burning the cook by direct contact with the hot oil and poses a secondary hazard of creating an air sol of oil droplets which is inflammable and may catch fire if exposed to an open flame. The prudent cook will attempt to cover the deep fat fryer to reduce oil splattering, but heretofor this has only been possible after the basket has reached the bottom of the hot oil reservoir.

OBJECTS OF THE INVENTION

It is therefore an object of the invention to reduce the amount of hot oil splattered from a deep fat fryer.

It is still another object of the invention to reduce the amount of hot oil splattered from a deep fat fryer during the critical period when the basket is being immersed in hot oil.

SUMMARY OF THE INVENTION

These and other objects, features and advantages of the invention are accomplished by the oil splatter screen for a deep fat fryer disclosed herein.

An oil splatter screen for a deep fat fryer is disclosed which protects the cook and the kitchen from hot oil drops splattered from a deep fat fryer. The device consists of a food basket with a bottom platform for supporting food to be fried, having a transverse dimension which is less than the inside transverse dimension of the frying vessel. A rod is mounted to the bottom platform of the basket, which projects upwardly to a height which is greater than the depth of the frying vessel. The rod supports the basket from above while it is being lowered into the vessel. A splatter screen is slideably mounted onto the rod, having a transverse dimension which is greater than the transverse dimension of the frying vessel's cavity. The splatter screen is supported and remains at the lip of the vessel while the basket is lowered into the cavity of the vessel by means of the rod sliding past the screen. The screen intercepts oil droplets splattered from hot oil in the frying vessel while permitting water vapor evolved from the foods being fried in the vessel, to escape without condensation. Thus oil splatters are prevented during the critical time when the foods to be fried are initially immersed into the hot cooking oil.

DESCRIPTION OF THE FIGURES

These and other objects, features and advantages of the invention will be more fully appreciated with reference to the accompanying figures.

FIG. 1 is a three dimensional view of the oil splatter screen for a deep fat fryer.

FIG. 2a is a schematic side view of the device of FIG. 1, showing relative dimensions.

FIG. 2b is a cross sectional view of a deep fat frying vessel, showing relative dimensions.

FIG. 2c is a schematic side view of the device of FIG. 2a at the beginning of the period during which the basket is inserted into the vessel shown in FIG. 2b.

FIG. 2d is a schematic side view of the device shown in FIG. 2a in its position at the end of the period during which it is inserted into the cavity of the vessel shown in FIG. 2b.

DISCUSSION OF THE PREFERRED EMBODIMENT

The function to be performed by the oil splatter screen invention is to intercept the hot oil droplets splattered from the frying vessel during the critical period when the food to be fired is initially immersed in the oil, while at the same time allowing the water vapor evolved from the frying foods to escape from the vessel so that it will not condense and drip back into the hot oil, causing further splattering. This function is accomplished by the oil splatter screen invention shown in FIG. 1. The relative dimensions of the oil splatter screen assembly are shown in FIG. 2a and the relative dimensions of the deep fat frying vessel into which the assembly will be inserted, is shown in FIG. 2d. The deep fat frying vessel 2 has a bottom 4 and side walls 6 forming the cavity 8 within which the hot cooking oil 16 is cooked. The overall shape of the vessel 2 may be circular or rectangular with a transverse inner dimension 10 as small as 5 inches for home deep fat fryers and as large as several feet for commercial deep fat fryers. The depth 12 of the vessel can be as small as 6 inches for a home deep fat fryer and as large as a foot or more for commercial deep fat fryers. The vessel has an upper lip 14 at the top opening through which the food basket 18 is introduced and immersed into the reservoir of cooking oil 16 in the bottom.

The oil splatter screen invention includes a food basket 18 having a bottom platform 20 for supporting food to be fired. The food basket 18 has a transverse dimension 22 which is less than the transverse dimension 10 of the frying vessel 2 and has an overall shape which approximately conforms with the overall rectangular or circular shape of the vessel. The device includes a rod 24 having a diameter of approximately 3/16 inch and length of approximately 10 inches, mounted to the bottom platform 20 and projecting upwardly therefrom, having a vertical dimension 26 which is greater than the depth 12 of the vessel 2. The rod supports the basket 18 from above while it is being lowered into the vessel 2, as is shown in FIG. 2c where the basket 18 has just been introduced past the lip of the vessel, and in FIG. 2d where the basket 18 has finally been immersed in the oil 16 in the bottom of the vessel 2. The device further includes a splatter screen 28 which is slideably mounted at 30 to the rod 24. The splatter screen 28 has a transverse dimension 32 which is greater than the transverse dimension 10 of the vessel. The splatter screen 28 is supported by and remains at the lip 14 of the vessel 2 as shown in FIGS. 2c and 2d, while the basket 18 is lowered into the cavity 8 of the vessel 2 by means of the rod 24 sliding at 30 past the screen 28. In this manner, during the critical period when the food basket is initially inserted into the vessel, hot cooking oil splattered from the cavity 8 of the vessel 2 will be caught by the screen at the lip 14 of the vessel 2, thereby preventing burn and fire hazards.

A handle 34 is mounted to the upper end of the rod 24 to enable the grasping of the rod. The handle 34 may be coated with a thermally insulating material 36, for example a thermoplastic such as nylon, which will prevent the cook's hand from coming into contact with the rod whose temperature is approximately equal to the temperature of the cooking oil.

The structure of the food basket 18 includes a side wall 38 mounted around the periphery of the bottom platform 20, which projects upwardly therefrom. The basket structure includes a lower wire ring 40 and an upper wire ring 42, each having a transverse dimension 22 which is less than the transverse dimension 10 of the vessel 2. The rings 40 and 42 are coaxially mounted in sapced, horizontal planes which can be separated by approximately 2½ inches, for example, and are joined by vertical support wires 44. Transverse wires 46 are diametrically mounted to the lower ring 40 and serve as the base to which the rod 24 is attached. A wire mesh 48 which may be an open square mesh composed of stainless steel, for example, covers the lower ring 40 and the upper ring 42 forming the bottom platform 20 and the side walls 38 of the food basket 18 while leaving an open top for the admission of food to be fried.

The structure of the splatter screen 28 includes an outer ring of wire 50 having a transverse dimension of 32 which is greater than the transverse dimension 10 of the vessel 2. An inner ring of wire 52 has a transverse dimension greater than the cross sectional dimension of the rod 24 to enable the ring 52 to easily slide along the rod 24. Radial wires 54 are mounted to and support the inner ring 52 and the outer ring 50 in coplanar, coaxial relationship. A screen 56 covers the inner ring 52 and the outer ring 50, with an opening 30 in the screen 56 within the area of the inner ring 52 so as to admit the rod 24.

The wire mesh 48 has larger openings therein than the opening in the screen 56 of the splatter screen 28, so as to permit cooking oil 16 to drain through the basket 18.

The screen 56 is composed of a wire mesh having an open square mesh size in the range of U.S. Standard screen sizes of from number 8 mesh which has sieve openings of 0.1 inches square to a number 50 mesh which has sieve openings of approximately 0.01 inches square. Although any fine hardware cloth can be employed for the screen 56, it has been found that mesh sizes in this range more efficiently intercept oil droplets splattered from the cavity 8 of the vessel 2 while the same time permitting water vapor to escape from the vessel. The screen wire mesh 56 may be composed of a material selected from a melt-spun continuous filament polyamide such as nylon 66 which has a melting point of approximately 500° F. or a melt-spun continuous filament polyester such as polyethylene terephthalate, otherwise known as Dacron, which also has a melting point of approximately 500° F. Other materials of which the screen 56 may be composed include aluminum, stainless steel, copper and brass.

The composition of the rod 24, the wire skeleton structure for the oil splatter screen 28, and wire skeleton structure for the basket 18 may all be of stainless steel, for example.

The oil splatter screen invention serves to protect the surroundings and the cook from being splattered by hot oil droplets during the critical period when the food basket is being inserted into the oil reservoir, during which time explosive pockets of steam are developed by ice or water on the food, which propel the hot oil droplets out of the vessel. During this period, the steam which is evolved must be allowed to escape from the vessel, otherwise it may condense upon the cooler upper surfaces of a lid, for example, and having so condensed, will drip back into the hot oil causing further splattering. The oil splatter screen invention thereby reduces the hazard to the cook of both primary burns due to contact with hot oil and secondary burns due to the flammability of oil air sols which would otherwise be produced by the splattering oil.

Although the invention has been particularly described in a specific embodiment, changes may be made in the construction, size, overall shape, and selection of materials without departing from the spirit and scope of the invention.

I claim:

1. A food carrying device for a deep fat frying vessel having a bottom and side walls forming a cavity with a transverse inner dimension and depth and an upper lip at the top opening, with cooking oil in the bottom thereof, comprising:

a food basket having a bottom platform for supporting food to be fried, having a transverse dimension less than said transverse dimension of said vessel;

a rod mounted to said bottom platform and projecting upwardly therefrom, having a vertical dimension greater than said depth of said vessel, for supporting said basket while being lowered into said vessel;

said food basket further comprising lower and upper rings of wire each having a transverse dimension less than said transverse dimension of said vessel, coaxially mounted in spaced, horizontal planes by a support wire vertically mounted to said lower and upper rings; a transverse wire diametrically mounted to said lower ring, serving as the base to which said rod is attached; and a wire mesh covering said lower and upper rings forming said bottom platform and a side wall of said food basket with an open top for the admission of food to be fried;

a splatter screen slideably mounted to said rod, having a transverse dimension greater than said transverse dimension of said vessel;

said splatter screen being supported by and remaining at said lip of said vessel while said basket is lowered into said cavity of said vessel by means of said rod sliding past said screen;

said splatter screen further comprising an outer ring of wire having a transverse dimension greater than said transverse dimension of said vessel; an inner ring of wire having a transverse dimension greater than the cross-sectional dimension of said rod; a radial wire mounted to and supporting said inner and outer rings in coplanar, coaxial relationship; and a screen covering said inner and outer rings, with an opening in the screen within said inner ring to admit said rod;

said wire mesh of said basket having larger openings therein than the openings in said screen of said splatter screen, to permit cooking oil to drain through said basket;

said screen being composed of a wire mesh having a mesh size in the range of from 8 mesh to number 50 mesh, to permit the interception of oil droplets splattered from the cavity of said vessel;

whereby hot cooking oil splattered from the cavity of said vessel will be caught by said screen at the lip of the vessel.

2. The device of claim 1, which further comprises: a handle mounted to the upper end of said rod to enable the grasping of said rod.

3. The device of claim 2, wherein said handle is thermally insulated.

4. The device of claim 3, wherein said wire mesh is composed of stainless steel.

5. The device of claim 4, wherein said screen of said splatter screen is composed of stainless steel.